(12) United States Patent
Athley et al.

(10) Patent No.: US 12,342,184 B2
(45) Date of Patent: Jun. 24, 2025

(54) EFFICIENT SCHEDULING OF TERMINAL DEVICES

(71) Applicant: Telefonaktiebolaget LM Ericsson (publ), Stockholm (SE)

(72) Inventors: Fredrik Athley, Kullavik (SE); Andreas Nilsson, Gothenburg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 338 days.

(21) Appl. No.: 17/795,449

(22) PCT Filed: Jan. 28, 2020

(86) PCT No.: PCT/EP2020/052071
§ 371 (c)(1),
(2) Date: Jul. 26, 2022

(87) PCT Pub. No.: WO2021/151472
PCT Pub. Date: Aug. 5, 2021

(65) Prior Publication Data
US 2023/0119660 A1    Apr. 20, 2023

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0695* (2013.01); *H04L 5/0051* (2013.01); *H04W 72/12* (2013.01)

(58) Field of Classification Search
CPC .... H04B 7/0695; H04L 5/0051; H04W 16/28; H04W 72/12
See application file for complete search history.

(56) References Cited

U.S. PATENT DOCUMENTS

2017/0331544 A1* 11/2017 Athley ................ H04B 7/0417
2018/0006696 A1*  1/2018 Yue .................... H04B 7/0617
(Continued)

FOREIGN PATENT DOCUMENTS

EP        3 110 031 A1     12/2016
KR   20200018479 A  *  2/2020 ............ H04W 16/28
(Continued)

OTHER PUBLICATIONS

International Search Report and Written Opinion issued in International Application No. PCT/EP2020/052071, dated Aug. 13, 2020 (12 pages).

*Primary Examiner* — Shah M Rahman
(74) *Attorney, Agent, or Firm* — Rothwell, Figg, Ernst & Manbeck, P.C.

(57) ABSTRACT

There is provided mechanisms for scheduling communication with terminal devices. A method is performed by a network node. The method comprises receiving, in response to having performed a beam management procedure involving transmission of reference signals in a set of beams, a beam report from each of the terminal devices. Each beam report indicates one of the beams as top ranked. The method comprises scheduling communication for the terminal devices in beams of the set of beams. At least a first terminal device of the terminal devices and a second terminal device of the terminal devices are both scheduled in a first beam of the beams not indicated as top ranked in the beam report of the second terminal device.

18 Claims, 7 Drawing Sheets

(51) Int. Cl.
  *H04L 5/00*    (2006.01)
  *H04W 72/12*   (2023.01)

(56) References Cited

U.S. PATENT DOCUMENTS

| | | | |
|---|---|---|---|
| 2018/0220436 A1* | 8/2018 | Athley | H04W 72/121 |
| 2018/0220448 A1* | 8/2018 | Akkarakaran | H04L 5/0091 |
| 2018/0249496 A1* | 8/2018 | Radulescu | H04B 7/0695 |
| 2019/0159054 A1* | 5/2019 | Yiu | H04B 7/088 |
| 2019/0306850 A1 | 10/2019 | Zhang et al. | |
| 2020/0008211 A1 | 1/2020 | Nilsson | |
| 2020/0059921 A1* | 2/2020 | Karjalainen | H04L 1/0028 |
| 2021/0067233 A1* | 3/2021 | Guan | H04B 7/088 |
| 2021/0144524 A1* | 5/2021 | Byun | H04B 7/0695 |
| 2021/0234575 A1* | 7/2021 | Nilsson | H04B 7/0408 |
| 2022/0190977 A1* | 6/2022 | Lee | H04B 17/336 |

FOREIGN PATENT DOCUMENTS

| | | | | |
|---|---|---|---|---|
| WO | WO-2018127335 A1 * | 7/2018 | | H04B 7/0617 |
| WO | 2018/232090 A1 | 12/2018 | | |
| WO | WO-2019080655 A1 * | 5/2019 | | H04L 5/00 |
| WO | WO-2019214725 A1 * | 11/2019 | | H04B 7/0695 |

* cited by examiner

EFFICIENT SCHEDULING OF TERMINAL DEVICES

CROSS REFERENCE TO RELATED APPLICATION(S)

This application is a 35 U.S.C. § 371 National Stage of International Patent Application No. PCT/EP2020/052071, filed 2020 Jan. 28.

TECHNICAL FIELD

Embodiments presented herein relate to a method, a network node, a computer program, and a computer program product for scheduling communication with terminal devices.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the network node and the beam used by the terminal device) is expected to be discovered and monitored by the network using measurements on downlink reference signals, such as channel state information reference signals (CSI-RS) or synchronization signal block (SSB) signals, used for beam management.

The CSI-RS for beam management can be transmitted periodically, semi-persistently or aperiodically (event triggered) and they can be either shared between multiple terminal devices or be device-specific. The SSB are transmitted periodically and are shared for all terminal devices. In order for the terminal device to find a suitable network node beam, the network node transmits the reference signal in different transmission (TX) beams on which the terminal device performs measurements, such as reference signal received power (RSRP), and reports back the M best TX beams (where M can be configured by the network). Furthermore, the transmission of the reference signal on a given TX beam can be repeated to allow the terminal device to evaluate a suitable reception (RX) beam. Reference signals that are shared between all terminal devices served by the TRP might be used to determine a first coarse direction for the terminal devices. It could be suitable for such a periodic TX beam sweep at the TRP to use SSB as the reference signal. One reason for this is that SSB are anyway transmitted periodically (for initial access/synchronization purposes) and SSBs are also expected to be beamformed at higher frequencies to overcome the higher propagation losses noted above.

In the term spatial quasi-location (QCL) generally refers to a relationship between the antenna port(s) of two different downlink reference signals (RSs). If two transmitted downlink RSs are configured by the network to be spatially QCL at the receiver of the terminal device, then the terminal device might assume that these two reference signals are transmitted with approximately the same spatial filter configuration at the TRP. Thus, the terminal device might then use approximately the same spatial filter configuration at its receiver to receive the second of these reference signals as it used to receive the first of these reference signals. In this way, spatial QCL is a term that assists in the use of analog beamforming and formalizes the notion of same receive beam at the terminal device over different time instances.

TRPs having an analog beamforming implementation are enabled to only transmit in one beam at a time. If the beams are narrow, this reduces the possibility to serve multiple terminal devices simultaneously (by e.g. using frequency multiplexing) since it is rather unlikely that two terminal devices to which data is to be transmitted are served in the same beam. Further, the transmission (as well as reception) of data might be bursty and dominated by small packets. Particularly when the TRP has an analog beamforming implementation and serves terminal devices that transmit/receive small packets in a bursty fashion, the TRP will soon run out of capacity since the communication with each terminal device will require transmission/reception of packets in its own beam and thereby also require its own time unit for this transmission/reception.

Hence, there is still a need for an improved scheduling of terminal devices in communication networks using beamformed transmission.

SUMMARY

An object of embodiments herein is to provide efficient scheduling of terminal devices in communication networks using beamformed transmission not suffering from the issues noted above, or at least where the above noted issues are mitigated or reduced.

According to a first aspect there is presented a method for scheduling communication with terminal devices. The method is performed by a network node. The method comprises receiving, in response to having performed a beam management procedure involving transmission of reference signals in a set of beams, a beam report from each of the terminal devices. Each beam report indicates one of the beams as top ranked. The method comprises scheduling communication for the terminal devices in beams of the set of beams. At least a first terminal device of the terminal devices and a second terminal device of the terminal devices are both scheduled in a first beam of the beams not indicated as top ranked in the beam report of the second terminal device.

According to a second aspect there is presented network node for scheduling communication with terminal devices. The network node comprises processing circuitry. The processing circuitry is configured to cause the network node to receive, in response to having performed a beam management procedure involving transmission of reference signals in a set of beams, a beam report from each of the terminal devices. Each beam report indicates one of the beams as top ranked. The processing circuitry is configured to cause the network node to schedule communication for the terminal devices in beams of the set of beams. At least a first terminal device of the terminal devices and a second terminal device of the terminal devices are both scheduled in a first beam of the beams not indicated as top ranked in the beam report of the second terminal device.

According to a third aspect there is presented network node for scheduling communication with terminal devices. The network node comprises a receive module) configured to receive, in response to having performed a beam management procedure involving transmission of reference signals in a set of beams, a beam report from each of the terminal devices. Each beam report indicates one of the beams as top ranked. The network node comprises a schedule module configured to schedule communication for the terminal devices in beams of the set of beams. At least a first terminal device of the terminal devices and a second terminal device of the terminal devices are both scheduled in a first beam of the beams not indicated as top ranked in the beam report of the second terminal device.

According to a fourth aspect there is presented a computer program for scheduling communication with terminal devices, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects provide efficient scheduling of terminal devices in communication networks using beamformed transmission.

Advantageously, the proposed scheduling does not suffer from the issues noted above.

Advantageously, these aspects enable improvement of the cell capacity in cells serving a large amount of terminal devices (e.g., transmitting/receiving small packets), especially for a network node having a TRP that implements analog beamforming.

Advantageously, these aspects enable increased probability of performing simultaneous scheduling of terminal devices when using frequency multiplexing.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
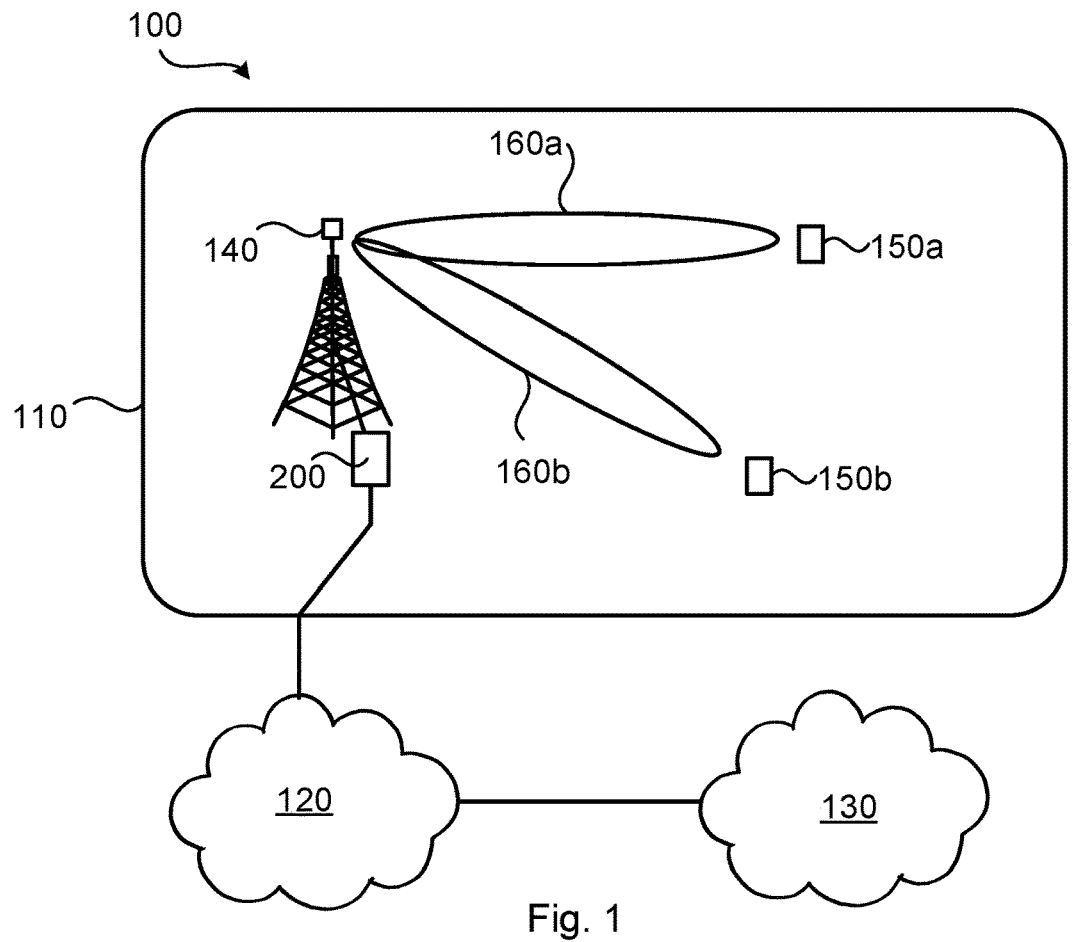
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, or a fifth (5G) telecommunications network and support any 3GPP telecommunications standard, where applicable.

The communication network 100 comprises a network node 200 configured to provide network access to terminal devices 150a, 150b in a radio access network 110. The radio access network 110 is operatively connected to a core network 120. The core network 120 is in turn operatively connected to a service network 130, such as the Internet. The terminal devices 150a, 150b are thereby enabled to, via the network node 200, access services of, and exchange data with, the service network 130.

The network node 200 comprises, is collocated with, is integrated with, or is in operational communications with, a transmission and reception point (TRP) 140. The network node 200 (via its TRP 140) and the terminal devices 150a, 150b are configured to communicate with each other in beams 160a, 160b.

Examples of network node 200 are radio access network nodes, radio base stations, base transceiver stations, Node Bs, evolved Node Bs, g NBs, access points, access nodes, and backhaul nodes. Examples of terminal devices 150a, 150b are wireless devices, mobile stations, mobile phones, handsets, wireless local loop phones, user equipment (UE), smartphones, laptop computers, tablet computers, network equipped sensors, network equipped vehicles, and so-called Internet of Things devices.

Assume that the TRP 140 is configured to generate X>1 different narrow beams, where, for example X is in the order of 10, 50, 100 or more, and that each terminal device 150*a*, 150*b* is configured to, in a beam report, report at least the beam out of the X beams in which a reference signal (such as a channel state information reference signal; CSI-RS) was best received according to some quality criterion, such as highest received power (such as reference signal received power; RSRP) or highest signal to interference plus noise ratio (SINR). This beam will, for any given terminal device, hereinafter be denoted as the top ranked beam for that given terminal device. Assume further that the same X beams are to be used for transmitting data to the terminal devices 150*a*, 150*b*. The network node 200 thus needs to schedule which beam is to be used for transmitting data to which terminal device 150*a*, 150*b*. In the illustrative example of FIG. 1, terminal device 150*a* is best scheduled in beam 160*a* and terminal device 150*b* is best scheduled in beam 160*b*.

As noted above, there is a need improved scheduling of terminal devices 150*a*, 150*b* in communication networks 100 using beamformed transmission The embodiments disclosed herein therefore relate to mechanisms for scheduling communication with terminal devices 150*a*, 150*b*. In order to obtain such mechanisms there is provided a network node 200, a method performed by the network node 200, a computer program product comprising code, for example in the form of a computer program, that when run on a network node 200, causes the network node 200 to perform the method.

At least some of the herein disclosed embodiments are based on scheduling a terminal device in a beam that has not been reported as the top ranked beam for that terminal device. This enables the terminal device to be co-scheduled with another terminal device in one and the same beam. For this to be possible it might in some embodiments be required that the performance of the terminal device that is not scheduled in its top ranked beam is still acceptable. Further aspects of how this might be ensured will be disclosed below.

Figure 2:
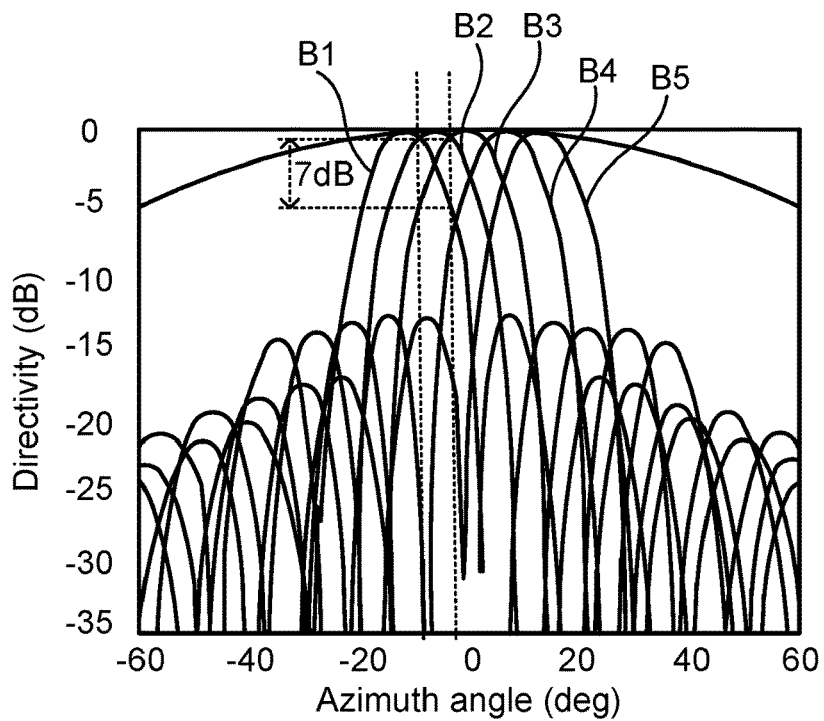
FIG. 2 schematically illustrates beam gain as function of azimuth angle according to an embodiment.

In FIG. 2 is given an illustrative example of how the maximum difference, or drop, in antenna gain between five different beams B1-B5 can be determined. In particular, FIG. 2 schematically illustrates the antenna gain pattern as modeled for an example antenna array. As seen in the figure, the maximum drop in antenna gain if using beam B1 instead of beam B2 is 7 dB. Further, if using beam B4 instead of beam B2 the maximum drop is infinity (it is noted that in reality, calibration errors in the antenna and mutual coupling contribute to make the maximum drop to be less than infinity); and if using beam B5 instead of beam B2 the maximum drop is 17 dB. The maximum difference, or drop, in antenna gain if using beam B5 instead of beam B2 is thus 17 dB although these beams are pointing in very different directions. This is because one of the sidelobes of beam B5 is pointing in the direction of the main lobe of beam B2. Mutual coupling might create even larger side lobes compared to the perfectly modelled antenna array without mutual coupling (as assumed in FIG. 2).

Figure 3:
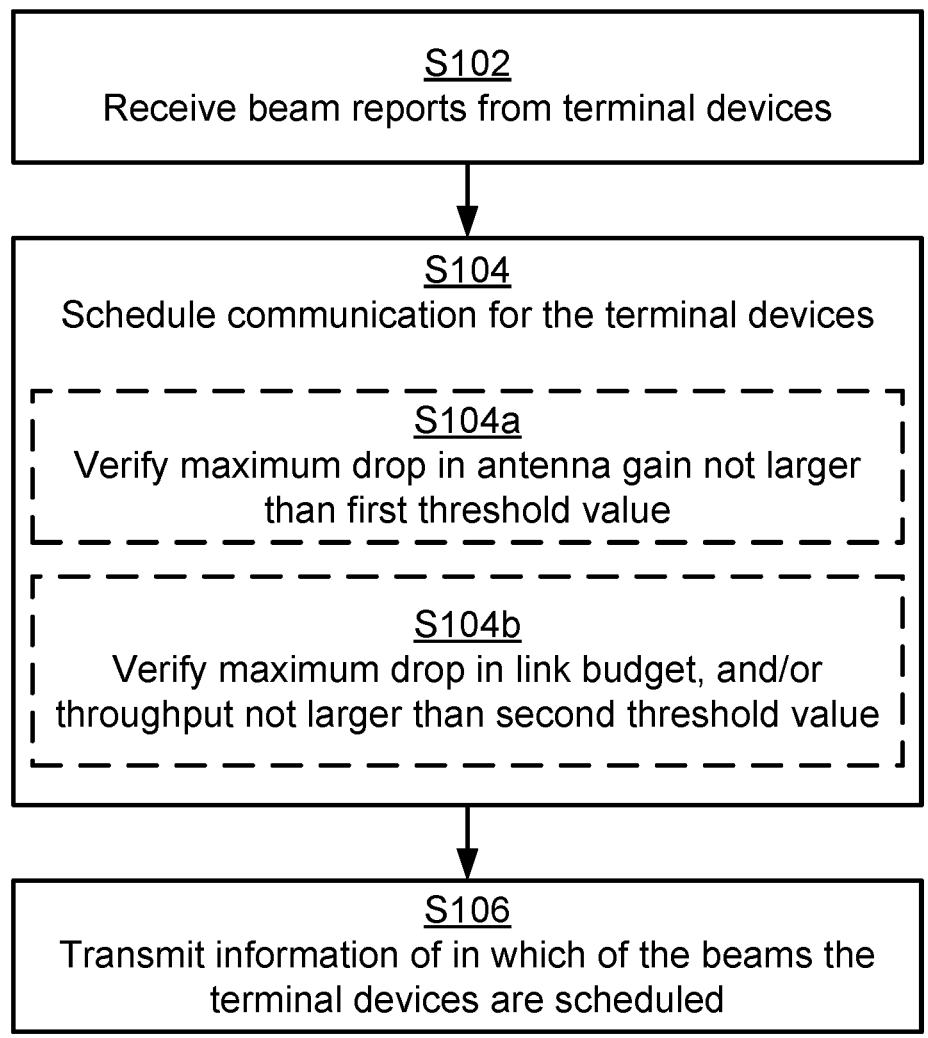
FIG. 3 is a flowchart of methods according to embodiments.

FIG. 3 is a flowchart illustrating embodiments of methods for scheduling communication with terminal devices 150*a*, 150*b*. The methods are performed by the network node 200. The methods are advantageously provided as computer programs 920.

It is assumed that a beam management procedure has been performed by the network node 200 and that the terminal devices 150*a*, 150*b* in response thereto sends beam reports to the network node 200. In particular, the network node 200 is configured to perform action S102:

S102: The network node 200 receives, in response to having performed a beam management procedure involving transmission of reference signals in a set of beams 160*a*, 160*b*; B1:B9, a beam report from each of the terminal devices 150*a*, 150*b*. Each beam report indicates one of the beams as top ranked.

In this respect, the beam report might either explicitly identify which beam is the top ranked one, or implicitly identify which beam is the top ranked one by providing a performance value, such as reference signal received power (RSRP) or signal to interference plus noise ratio (SINR) for each reported beam. That is, the beam report from terminal device 150*a* indicates the beam as top ranked by this terminal device 150*a*. Since the terminal devices 150*a*, 150*b* might be geographically spread with respect to each other, it might therefore be that different ones of the terminal devices 150*a*, 150*b* report different ones of the beams as top ranked. Examples thereof will be disclosed below with reference to FIGS. 4 and 5. However, the network node 200 might still serve two or more of the terminal devices 150*a*, 150*b* in one and the same beam despite some of these two or more of the terminal devices 150*a*, 150*b* not having reported that beam as the top tanked one. In particular, the network node 200 is configured to perform action S104:

S104: The network node 200 schedules communication for the terminal devices 150*a*, 150*b* in beams of the set of beams 160*a*, 160*b*; B1:B9. At least a first terminal device 150*a* of the terminal devices 150*a*, 150*b* and a second terminal device 150*b* of the terminal devices 150*a*, 150*b* are both scheduled in a first beam 160*a*, B2, B3 of the beams not indicated as top ranked in the beam report of the second terminal device 15*ob*.

Two or more terminal devices 150*a*, 150*b* might thereby be frequency-multiplexed in one beam, despite one or more of those terminal devices 150*a*, 150*b* not having reported that beam as the top ranked one. That is, in some embodiments, the communication is scheduled to, in the first beam 160*a*, B2, B3, use frequency multiplexed communication for at least the first terminal device 150*a* and the second terminal device 150*b*, where the terminal devices 150*a*, 150*b* thus are multiplexed in different parts of the frequency band. That is, the frequency multiplexed communication is scheduled in a frequency band, and each of the at least the first terminal device 150*a* and the second terminal device 150*b* is allocated its own part of the frequency band. This is feasible at least for terminal devices 150*a*, 150*b* that have a link budget good enough to be served by a beam that is not the best beam. This is feasible, for example, for terminal devices 150*a*, 150*b* located geographically close to the TRP 140, for terminal devices 150*a*, 150*b* having low data rate requirements, and/or depending on radio propagation conditions (for example if there is line of sight (LOS) or no line of sight (NLOS) between the TRP 140 and the terminal devices 150*a*, 150*b*.

Embodiments relating to further details of scheduling communication with terminal devices 150*a*, 150*b* as performed by the network node 200 will now be disclosed.

In some examples, the network node 200 has access to information of the maximum difference in antenna gain between the different beams that could be generated by the TRP 140. Values of the maximum difference in antenna gain might be obtained from embedded radiation pattern measurements (including mutual coupling) on the antenna architecture that is used for that type of TRP. Values of the maximum difference in antenna gain might additionally or alternatively be based on measurements as obtained when designing the TRP 140, from simulations, from measurements in an anechoic chamber when testing the TRP 140, and/or from measurements in the field where the TRP 140 is deployed. The network node 200 might use such information together with the received beam reports from the terminal devices 150*a*, 150*b* to determine which terminal devices 150*a*, 150*b* that could be scheduled simultaneously in one and the same beam. Values of the maximum difference in antenna gain might be tabulated, for example as in Table 1.

TABLE 1

Values of maximum drop in antenna gain

| Other | Best | | | | |
|---|---|---|---|---|---|
| | Beam 1 | Beam 2 | Beam 3 | Beam 4 | Beam 5 |
| Beam 1 | — | 7 dB | >30 dB | 17 dB | >30 dB |
| Beam 2 | >30 dB | — | 7 dB | >30 dB | >30 dB |
| Beam 3 | >30 dB | 7 dB | — | 7 dB | >30 dB |
| Beam 4 | >30 dB | >30 dB | 7 dB | — | >30 dB |
| Beam 5 | >30 dB | 17 dB | >30 dB | 7 dB | — |

Table 1 gives an illustrative example of values of maximum drop in antenna gain between two beams based on the five beams illustrated in FIG. 2. That is, if beam 2 is reported by one of the terminal devices as the top ranked, or best, beam, a performance drop of at most 7 dB is to be expected for this terminal device if instead this terminal device is scheduled in beam 1. According to the table, the values are not symmetrical. For example, if beam 1 is reported by one of the terminal devices, a performance drop of >30 dB might be expected for this terminal device if instead this terminal device is scheduled in beam 2. one reason for this is that beam 4 and beam 5 are edge beams, i.e., beams having only one single neighboring beam. For an actual deployment of the TRP 140, due to, for example angular spread in the radio propagation channel, the actual difference in antenna gain between two beams might be much less than the values given in the table.

In some embodiments, the beams in the set of beams 160*a*, 160*b*; B1:B9 are generated by means of analog beamforming. Thus, per time instant, only one of the beams is active for communicating with the terminal devices 150*a*, 150*b*.

There could be different ways for the terminal devices 150*a*, 150*b* to select which beam to be the top ranked one. In some aspects, the terminal devices 150*a*, 150*b* perform measurements on signals as transmitted in beams from the TRP 140 of the network node 200. Examples of such measurements relate to received power and signal to interference plus noise ratio. That is, according to an embodiment, the beam report of the second terminal device 150*b* indicated a second beam 160*b*, B4, B7 of the beams as top ranked, and the second beam 160*b*, B4, B7 corresponds to that beam in the set of beams 160*a*, 160*b*; B1:B9 in which one of the reference signals was by the second terminal device 150*b* received with highest received power (such as RSRP) or highest SINR. Further, the first beam might be the beam that was reported as top ranked by the first terminal device 150*a*. However, in some examples the first terminal device 150 and the second terminal device 150*b* are co-scheduled with a third terminal device in the first beam where it is the third terminal device that has reported the first beam as top ranked.

In some examples the terminal devices 150*a*, 150*b* report only the top ranked beam. However, in other examples the terminal devices 150*a*, 150*b* each report two or more beams, where thus one beam per report is the top ranked one. Reporting only the top ranked beam might minimize the overhead signaling for beam management whereas reporting two or more beams might enable the network node 200 to better select which two or more terminal devices 150*a*, 150*b* to co-schedule in the same beam.

Further, there might be different criteria that the network node 200 uses, or at least considers, when determining which at least two terminal devices 150*a*, 150*b* to co-schedule in the same beam, and thus to determine whether or not it is possible to schedule at least the first terminal device 150*a* of the terminal devices 150*a*, 150*b* and the second terminal device 150*b* of the terminal devices 150*a*, 150*b* in the first beam 160*a*, where this first beam 160*a* is not indicated as top ranked in the beam report of the second terminal device 150*b*.

In particular, according to an embodiment, the beam report of the second terminal device 150*b* indicated a second beam 160*b*, B4, B7 of the beams as top ranked. A performance value for communicating data with the second terminal device 150*b* as scheduled in the first beam 160*a*, B2, B3 might then be estimated as less than a threshold value worse than if the second terminal device 150*b* instead is scheduled in the second beam 160*b*, B4, B7 (in order for the second terminal device 150*b* to be co-scheduled in the first beam 160*a*). Non-limiting examples of such performance values are: antenna gain, link budget, throughput. Thus, in some examples the second terminal device 150*b* is only co-scheduled with the first terminal device 150*a* in the first beam if the estimated performance drop in terms of antenna gain, link budget, and/or throughput for the second terminal device 150*b* not being scheduled in its reported top ranked beam (i.e., in the second beam 160*b*) is less than a threshold value.

Further details the criteria used, or at least considered, by the network node 200 when determining which at least two terminal devices 150*a*, 150*b* to co-schedule in the same beam will now be disclosed.

In some aspects, the criteria relates to the maximum antenna gain differences between the different beams. That is, according to an embodiment, whether to schedule communication for the second terminal device 150*b* in the first beam 160*a*, B2, B3 or not is based on a maximum drop in antenna gain as resulting if data is communicated with the second terminal device 150*b* in the first beam 160*a*, B2, B3 instead of in the second beam 160*b*, B4, B7. Further in this respect, according to an embodiment, the network node 200 is configured to perform (optional) action S104*a* as part of the scheduling in action S104:

S104*a*: The network node 200 verifies that the maximum drop in antenna gain for the second terminal device 150*b* is not larger than a first threshold value.

In some aspects, the criteria relates to the link budget, throughput, and/or bandwidth, being good enough for the terminal device to be served by a beam that is not reported as the top ranked one for that terminal device. That is, according to an embodiment, whether to schedule communication for the second terminal device 150*b* in the first beam 160*a*, B2, B3 or not is based on a maximum drop in link budget, throughput, and/or bandwidth as resulting if data is communicated with the second terminal device 150*b* in the first beam 160a, B2, B3 instead of in the second beam 160b, B4, B7. Further in this respect, according to an embodiment, the network node 200 is configured to perform (optional) action S104b as part of the scheduling in action S104:

S104b: The network node 200 verifies that the maximum drop in link budget, and/or throughput for the second terminal device 150b is not larger than a second threshold value.

In some examples both actions S104a and S104b are performed as part of action S104.

Further, before using the first beam 160a for communicating data with the second terminal device 150b, the network node 200 might perform further testing of the first beam, for example by considering reportings from the second terminal device 150b of signals as received by the second terminal device 150b from the TRP 140 in the first beam 160a. That is, in some embodiments, the verifying in action S104a and/or S104b is based on reporting from the second terminal device 150b of a reference signal in the first beam 160a, B2, B3. When two or more terminal devices 150a, 150b have been identified as candidates for being co-scheduled in the same beam, the network node 200 might thus transmit CSI-RS for CSI acquisition for each respective terminal device scheduled in the same beam and based on the corresponding CSI reports make a final decision regarding whether the terminal devices 150a, 150b can be co-scheduled in the same beam or not, and also determine a suitable modulation and coding scheme (MCS), rank, and precoding matrix index (PMI) for each respective terminal device 150a, 150b.

In some aspects, for example when the terminal devices 150a, 150b utilizes analog beamforming, the network node 200 might signal to the terminal devices 150a, 150b which beams are used for scheduling the terminal devices 150a, 150b. That is, according to an embodiment, the network node 200 is configured to perform (optional) action S106:

S106: The network node 200 transmits, before communicating data with at least the first terminal device 150a and the second terminal device 150b in the first beam 160a, B2, B3, information of in which of the beams the terminal devices 150a, 150b are scheduled.

In this respect, the information might not explicitly identify which beam is used. Rather, the information might be provided in terms of a pointer to a previously transmitted reference signal which was transmitted in the scheduled beam, or a beam with similar spatial characteristics as the scheduled beam. The information might be conveyed within a spatial QCL framework. This could be done for a downlink data channel, such as the physical downlink shared channel (PDSCH) by signaling a Transmission Configuration Indicator (TCI) state (where the TCI state includes a spatial QCL reference to an earlier transmitted downlink reference signal) in the DCI triggering the PDSCH transmission. The indicated TCI state should thus point at the first beam 160a for both the first terminal device 150a and the second terminal device 150b. Further aspects relating to the use of TCI states for this purpose will be disclosed below.

Figure 4:
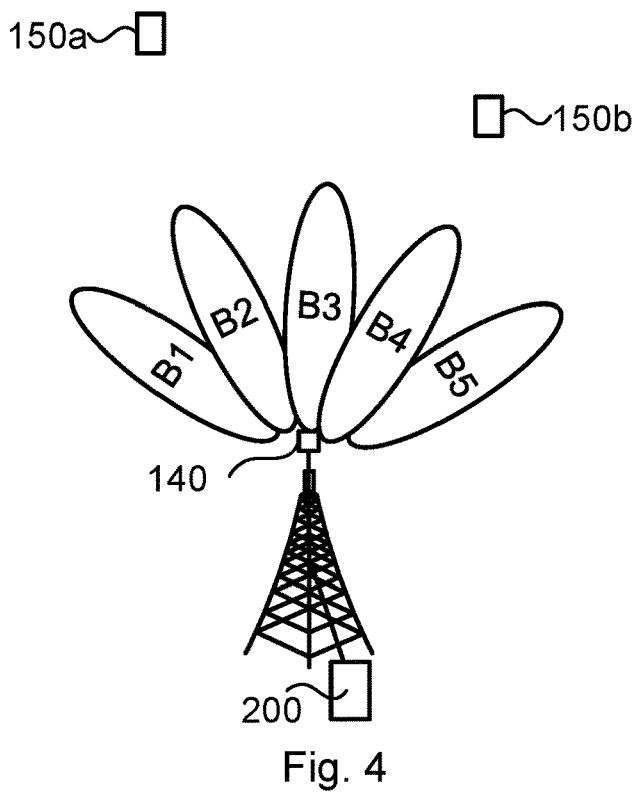
FIG. 4 and FIG. 5 schematically illustrate beamformed communication between a TRP and terminal devices according to embodiments.

Reference is now made to FIG. 4 that schematically illustrates a TRP 140 controlled by a network node 200 and that is configured to serve two terminal devices 150a, 150b in beams B1, B2, B3, B4, B5 in accordance with the herein disclosed embodiments. For illustrative purposes it is assumed that the RSRP measured and reported for beam B2 by terminal device 150a was −100 dBm, and that the RSRP measured and reported for beam B4 by terminal device is −70 dBm. Assume for illustrative purposes further that both these terminal devices 150a, 150b are to receive data. Assume for illustrative purposes further that a minimum RSRP of −100 dBm is required for reliable data communication with any of the terminal devices 150a, 150b. In order to communicate with terminal device 150a, the full antenna gain of B2 thus is needed. Assume for illustrative purposes further that the maximum drop in antenna gain between beam B2 and beam B4 is 17 dB in the angular interval corresponding to where B2 is the strongest beam. In case data communication with terminal device 150b utilizes beam B2 instead of B4, the antenna gain for terminal device 150b would thus be reduced to −87 dBm which is still more than −100 dBm. Therefore, the network node 200 might co-schedule terminal devices 150a, 150b for simultaneous downlink data transmitted in beam B2 whilst still maintaining a sufficient link budget for both these terminal devices 150a, 150b.

Further aspects of the information of in which of the beams the terminal devices 150a, 150b are scheduled will now be disclosed. In some aspects, the information is conveyed by means of TCI state information. That is, according to an embodiment, the information is in S106 transmitted by signalling of a TCI state. Further, in some embodiments the network node 200 configures each of the terminal devices 150a, 150b to simultaneously have more than one active TCI state. Further in this respect, when selecting spatial QCL using DCI, the network node 200 might commonly only select between 8 different active TCI states, whilst the number of beams used by the TRP 140 might be much larger than that. To address this issue, in some embodiments, the terminal devices 150a, 150b are by the network node 200 configured with active TCI states that take the maximum drop in antenna gain between the different beams into account. With reference again to the illustrative example of FIG. 4, terminal device 150b as served by beam B4, can have one active TCI state corresponding to each of beams B4, B3, B5, and B2. B4 is the top ranked beam by this terminal device. Beam B3 and beam B5 are the beams located adjacent the currently reported top ranked beam and information thereof might be useful if the terminal device 150b is moved and the drop in antenna gain between beam B4 and beam B3 and between B4 and B5 is low, which could facilitate co-scheduling of terminal device 150b one or more other terminal devices that has reported beam B3 or B5 as the top ranked one. Beam B2 is included in case it has a low drop in antenna gain compared to beam B4 and could therefore potentially be used for co-scheduling this terminal device with one or more other terminal devices in this beam. Hence, in some embodiments, each TCI state corresponds to one of the beams in the set of beams 160a, 160b; B1:B9.

In other embodiments, when the beam management procedure further involves transmission of other reference signals in another set of beams SSB1:SSB3, each TCI state might correspond to one beam in the further set of beams SSB1:SSB3. As will be further disclosed below, the beams in this another set of beams SSB1:SSB3 might then be wider than the beams in the set of beams 160a, 160b; B1:B9.

Figure 5:
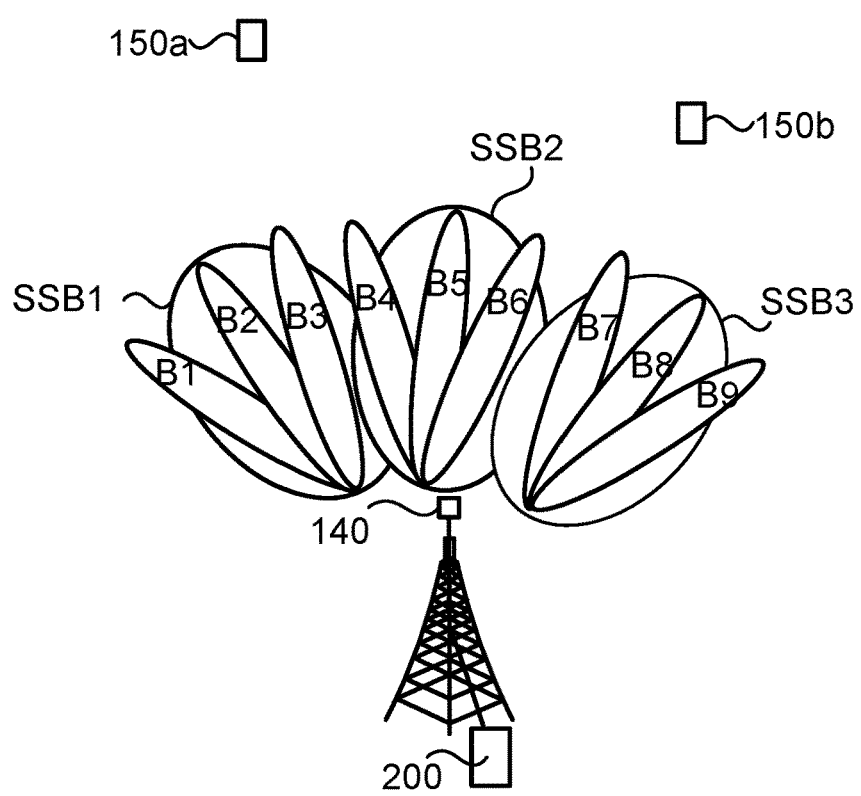

Reference is now made to FIG. 5 that schematically illustrates a TRP 140 controlled by a network node 200 and that is configured to serve two terminal devices 150a, 150b in beams B1, B2, B3, B4, B5, B6, B7, B8, B9, SSB1, SSB2, SSB3 in accordance with the herein disclosed embodiments. According to the illustrative example of FIG. 5, the TRP 140 is configured to generate three wide beams SSB1, SSB2, SSB3 that are used for transmission of synchronization signal blocks (SSBs), and nine narrow beams B1, B2, B3, B4, B5, B6, B7, B8, B9 that are used for transmission of CSI-RS as well as data. The antenna beam pattern of SSB1 covers beams B1, B2, B3, the antenna beam pattern of SSB2 covers beams B4, B5, B6, and the antenna beam pattern of SSB3 covers beams B7, B8, B9. It is thereby possible that each TCI state is related to one SSB beam (i.e., one of beams SSB1, SSB2, SSB3) each. Since the number of SSB beams generally is much smaller than the number of narrow beams, the network node 200 might signal the spatial QCL for different terminal device 150a, 150b using DCI in the SSB beams since there are then also fewer TCI states that are needed to cover the whole cell (as defined by the coverage of all SSB beams). For example, even if the TRP 140 is configured to generate only 8 SSB beams, then 8 active TCI states can correspond to these 8 SSB beams. In this case, the network node 200 might co-schedule its served terminal devices 150a, 150b and then signal the spatial QCL by indicating one of the 8 active TCI states.

Figure 6:
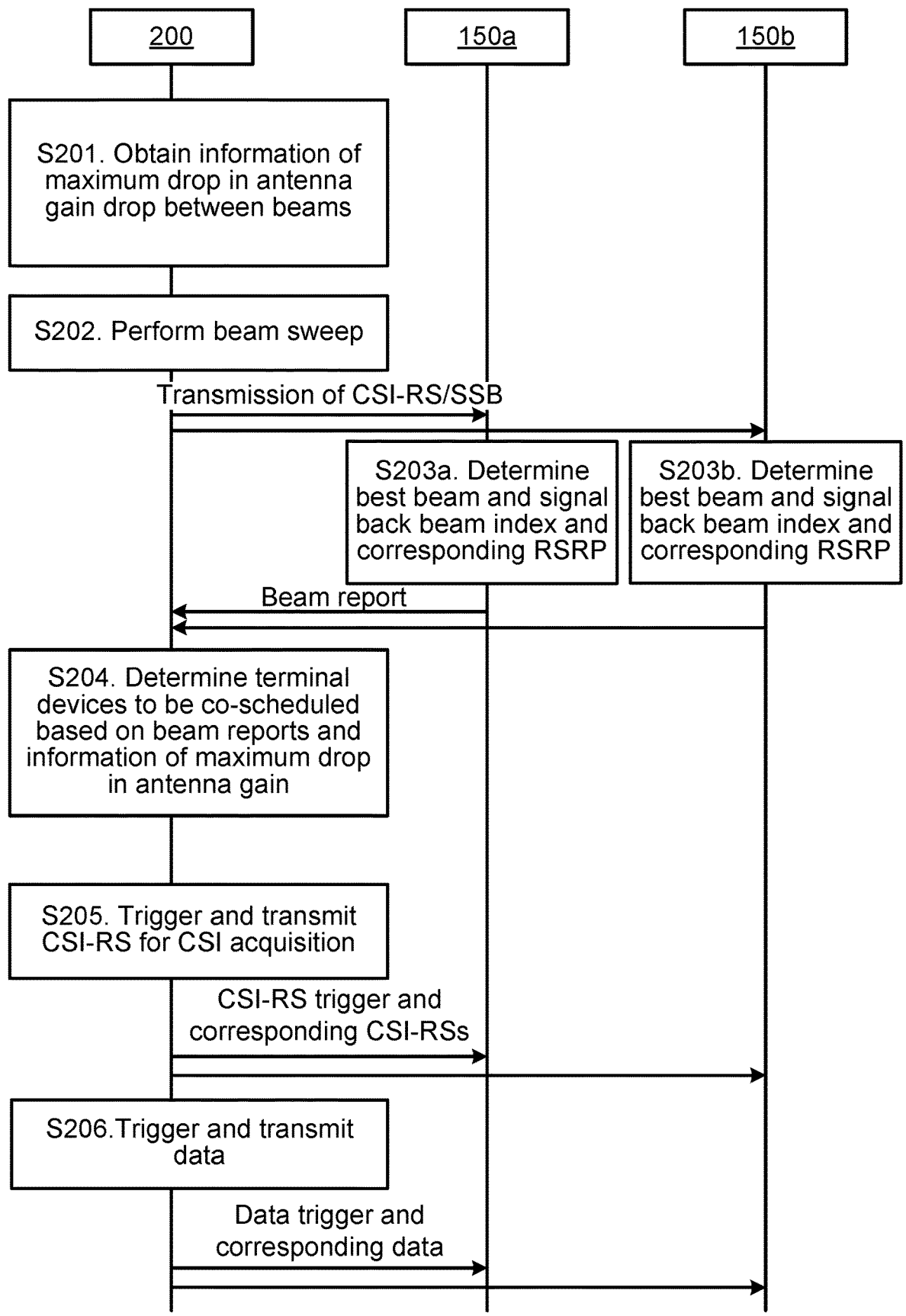
FIG. 6 is a signalling diagram of a method according to an embodiment.

One particular embodiment for scheduling communication with terminal devices 150a, 150b as performed by the network node 200 based on at least some of the above embodiments, aspects, and examples will now be disclosed with reference to the signalling diagram of FIG. 6.

S201: The network node 200 obtains information of the maximum drop in antenna gain between the beams that could be generated by its TRP 140.

S202: The network node 200 performs a beam sweep where reference signals (such as SSB or CSI-RS) are transmitted in beams.

S203a, S203b: Each terminal device 150a, 150b receives the reference signals as transmitted in one or more of the beams, determines therefrom at least the top ranked beam, and reports in a beam report at least the top ranked beam (and, optionally, the corresponding RSRP of the top ranked beam).

S204: The network node 200, based on the beam reports and the information of the maximum drop in antenna gain, determines in which beam to schedule each terminal device 150a, 150b it has received a beam report from. Terminal device 150a and terminal device 150b are both scheduled in the beam reported as top ranked by terminal device 150a but not by terminal device 150. One of the beams is thus selected for scheduling terminal device 150a and terminal device 150b.

S205: The network node 200, for acquiring channel state information (CSI) from the terminal devices 150a, 150b, triggers and transmits CSI-RS in the selected beam.

S206: The network node 200 triggers transmission of the data and transmits the data, for example by means of PDSCH signalling, towards the terminal devices 150a, 150b in the selected beam. When transmission is triggered the network node 200 might transmit a spatial QCL reference to the selected beam.

Figure 7:
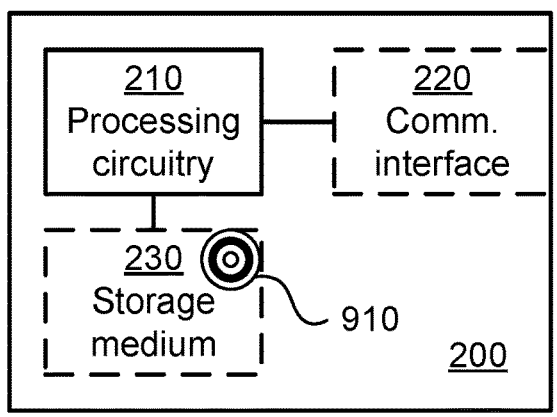
FIG. 7 is a schematic diagram showing functional units of a network node according to an embodiment.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or actions, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, functions, nodes, and devices of the communication network 100 of FIG. 1, as well as with terminal devices 150a, 150b. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 8:
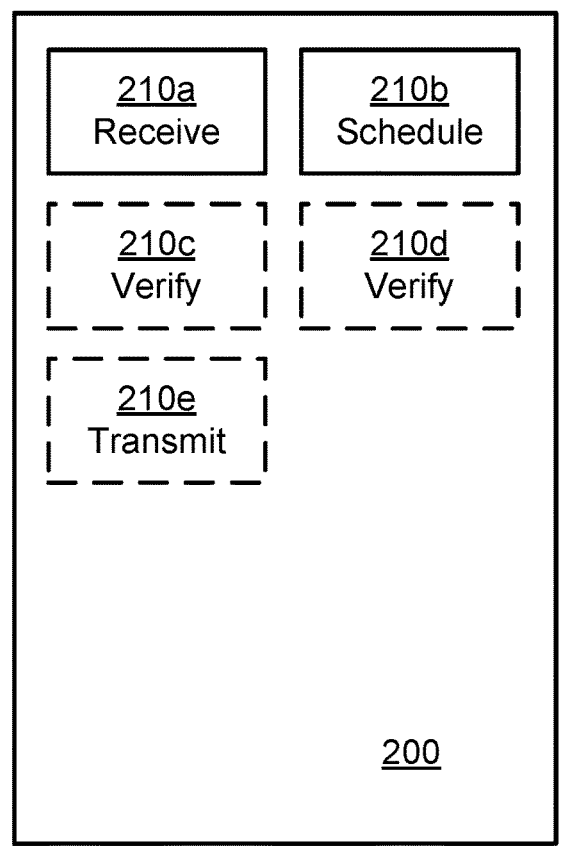
FIG. 8 is a schematic diagram showing functional modules of a network node according to an embodiment.

FIG. 8 schematically illustrates, in terms of a number of functional modules, the components of a network node 200 according to an embodiment. The network node 200 of FIG. 8 comprises a number of functional modules; a receive module 210a configured to perform action S102, and a schedule module 210b configured to perform action S104. The network node 200 of FIG. 8 may further comprise a number of optional functional modules, such as any of a first verify module 210c configured to perform action S104a, a second verify module 210d configured to perform action S104b, and a transmit module 210e configured to perform action S106. In general terms, each functional module 210a-210e may in one embodiment be implemented only in hardware and in another embodiment with the help of software, i.e., the latter embodiment having computer program instructions stored on the storage medium 230 which when run on the processing circuitry makes the network node 200 perform the corresponding actions mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any actions as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 7 the processing circuitry 210 may be distributed among a plurality of devices, or nodes. The same applies to the functional modules 210a-210e of FIG. 8 and the computer program 920 of FIG. 9.

Figure 9:
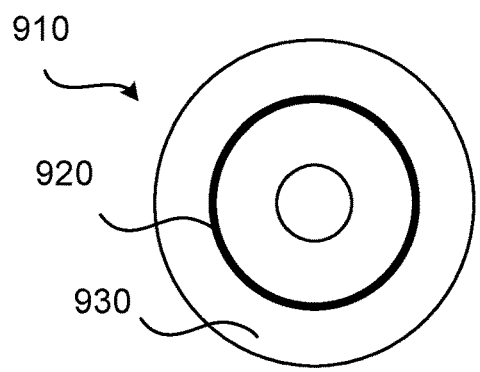
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any actions as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

Figure 10:
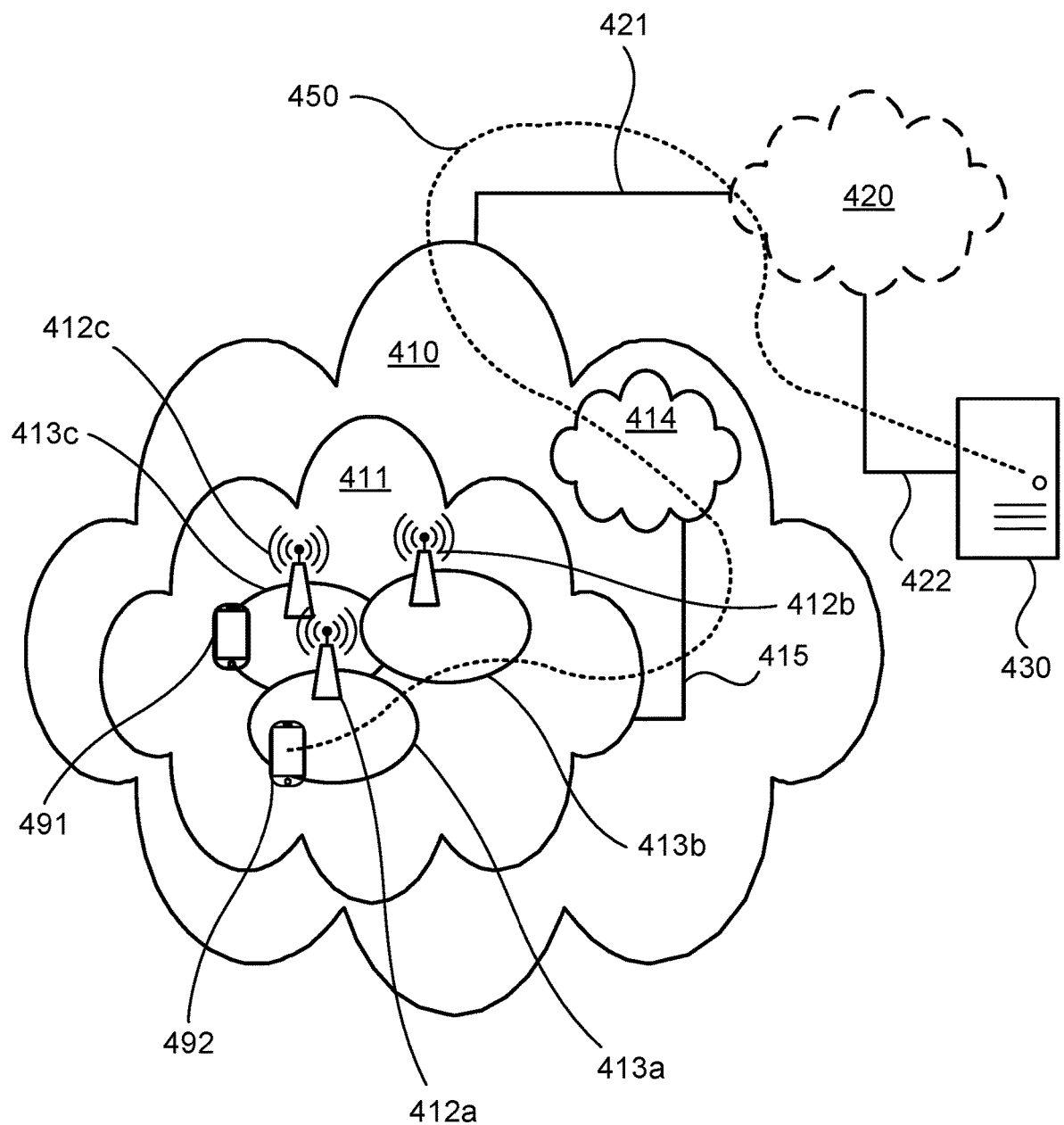
FIG. 10 is a schematic diagram illustrating a telecommunication network connected via an intermediate network to a host computer in accordance with some embodiments.

FIG. 10 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network 110 in FIG. 1, and core network 414, such as core network 120 in FIG. 1. Access network 411 comprises a plurality of radio access network nodes 412a, 412b, 412c, such as NBs, eNBs, gNBs (each corresponding to the network node 200 of FIG. 1) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal devices 150a, 150b of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 11:
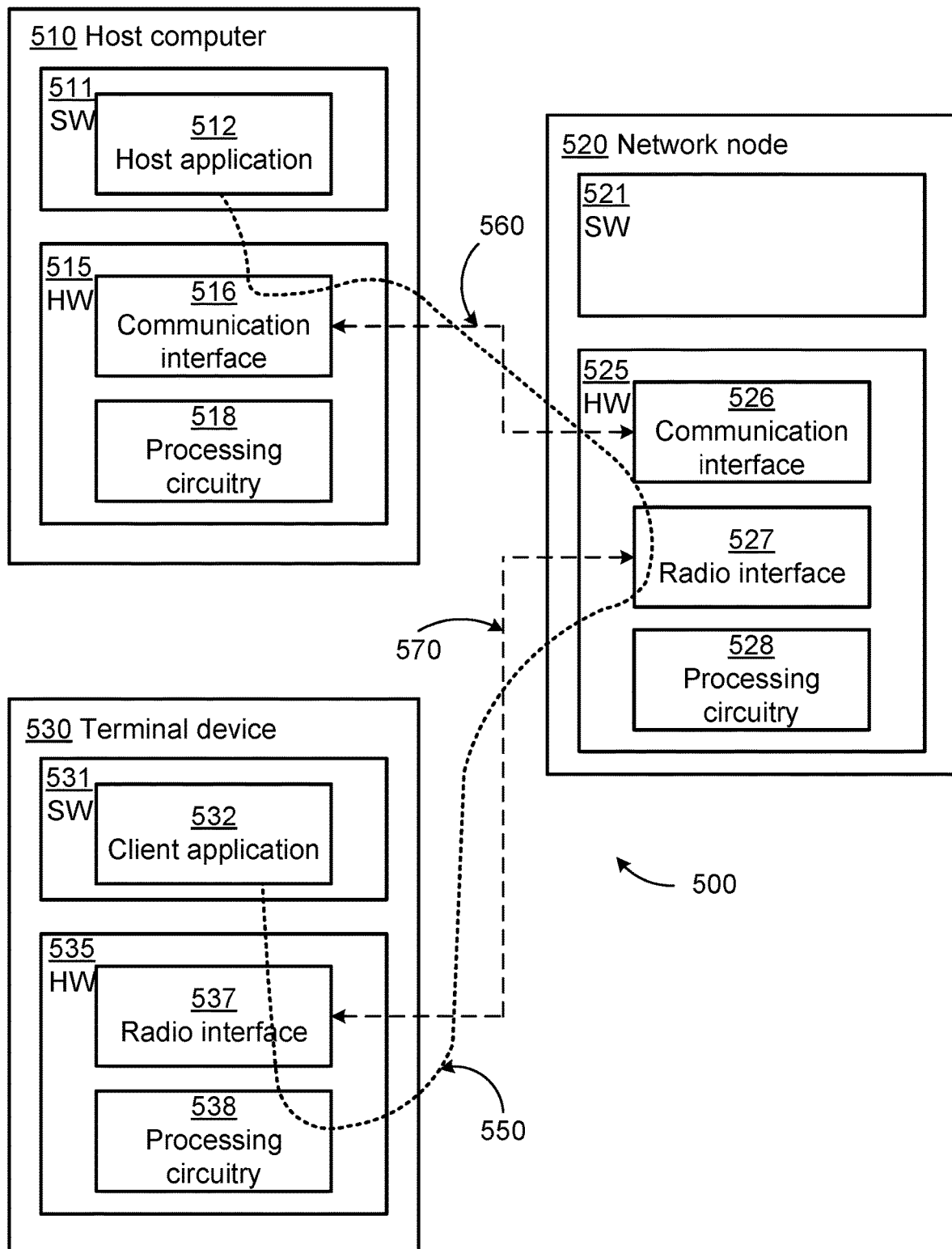
FIG. 11 is a schematic diagram illustrating host computer communicating via a radio base station with a terminal device over a partially wireless connection in accordance with some embodiments.

FIG. 11 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal devices 150a, 150b of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 200 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by radio access network node 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 11 may be similar or identical to host computer 430, one of network nodes 412*a*, 412*b*, 412*e* and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for scheduling communication with terminal devices, the method being performed by a network node, the method comprising:

receiving, in response to having performed a beam management procedure involving transmission of reference signals in a set of beams including a first beam and a second beam, a first beam report from a first terminal device and a second beam report from a second terminal device, the first beam report indicating the first beam as being top ranked by the first terminal device and the second beam report indicating the second beam as being ranked by the second terminal device higher than the first beam;

obtaining information indicating an estimated performance difference associated with a beam pair consisting of the first beam and the second beam, wherein the estimated performance difference is based on a difference between an estimated performance associated with the first beam and an estimated performance associated with the second beam;

determining whether to schedule communication for the second terminal device in the first beam based on the information indicating the estimated performance difference; and scheduling communication for the terminal devices in beams of the set of beams, wherein the first terminal device and the second terminal device are both scheduled in the first beam.

2. The method of claim 1, wherein
the second beam report indicates that the second beam is top ranked.

3. The method of claim 1, wherein
the second beam report indicates that the second beam is top ranked, and
the estimated performance difference is an estimated drop in antenna gain.

4. The method of claim 3, wherein the determining comprises:
determining to schedule communication for the second terminal device in the first beam as a result of determining that the estimated drop in antenna gain is not larger than a threshold value.

5. The method of claim 1, wherein
the estimated performance difference is an estimated difference in link budget or an estimated difference in throughput, and
the determining comprises determining to schedule communication for the second terminal device in the first beam as a result of determining that the estimated performance difference is not larger than a threshold value.

6. The method of claim 1, wherein the method further comprises determining the estimated performance associated with the first beam based on reporting from the second terminal device of a reference signal in the first beam.

7. The method of claim 1, wherein the communication is scheduled to, in the first beam, use frequency multiplexed communication for at least the first terminal device and the second terminal device.

8. The method of claim 1, wherein the method further comprises:
transmitting, before communicating data with at least the first terminal device and the second terminal device in the first beam, information of in which of the beams the terminal devices are scheduled.

9. The method of claim 8, wherein the information is transmitted by signaling of a Transmission Configuration Indicator (TCI) state.

10. The method of claim 9, wherein the network node configures each of the terminal devices to simultaneously have more than one active TCI state.

11. The method of claim 10, wherein the terminal devices are by the network node configured with active TCI states that take maximum drop in antenna gain between the beams in the set of beams into account.

12. The method of claim 10, wherein each TCI state corresponds to one of the beams in the set of beams or, when the beam management procedure further involves transmission of other reference signals in another set of beams, to one beam in the further set of beams.

13. The method of claim 12, wherein the beams in said another set of beams are wider than the beams in the set of beams.

14. The method of claim 1, wherein
the second beam report indicates that the second beam is top ranked, and
the second beam corresponds to that beam in the set of beams in which one of the reference signals was by the second terminal device received with highest received power or signal to interference plus noise ratio.

15. The method of claim 1, wherein the beams in the set of beams are generated by means of analog beamforming wherein, per time instant, only one of the beams is active for communicating with the terminal devices.

16. The method of claim 1, wherein
the estimated performance difference is an estimated difference in antenna gain, an estimated difference in link budget, or an estimated difference in throughput, and
the estimated performance difference is equal to the difference between the estimated performance associated with the first beam and the estimated performance associated with the second beam.

17. A network node for scheduling communication with terminal devices, the network node comprising processing circuitry, the processing circuitry being configured to cause the network node to:
receive, in response to having performed a beam management procedure involving transmission of reference signals in a set of beams including a first beam and a second beam, a first beam report from a first terminal device and a second beam report from a second terminal device, the first beam report indicating the first beam as being top ranked by the first terminal device and the second beam report indicating the second beam as being ranked by the second terminal device higher than the first beam;
obtain information indicating an estimated performance difference associated with a beam pair consisting of the first beam and the second beam, wherein the estimated performance difference is equal to or based on a difference between an estimated performance associated with the first beam and an estimated performance associated with the second beam;
determine whether to schedule communication for the second terminal device in the first beam based on the information indicating the estimated performance difference; and
schedule communication for the terminal devices in beams of the set of beams, wherein the first terminal device and the second terminal device are both scheduled in the first beam.

18. A non-transitory computer readable storage medium storing a computer program for scheduling communication with terminal devices, the computer program comprising computer code which, when run on processing circuitry of a network node, causes the network node to:
receive, in response to having performed a beam management procedure involving transmission of reference signals in a set of beams including a first beam and a second beam, a first beam report from a first terminal device and a second beam report from a second terminal device, the first beam report indicating the first beam as being top ranked by the first terminal device and the second beam report indicating the second beam as being ranked by the second terminal device higher than the first beam;
obtain information indicating an estimated performance difference associated with a beam pair consisting of the first beam and the second beam, wherein the estimated performance difference is equal to or based on a difference between an estimated performance associated with the first beam and an estimated performance associated with the second beam;

determine whether to schedule communication for the second terminal device in the first beam based on the information indicating the estimated performance difference; and schedule communication for the terminal devices in beams of the set of beams, wherein the first terminal device and the second terminal device are both scheduled in the first beam.

* * * * *